No. 779,259. PATENTED JAN. 3, 1905.
J. M. BRASINGTON.
FERTILIZER DISTRIBUTER.
APPLICATION FILED AUG. 16, 1904.
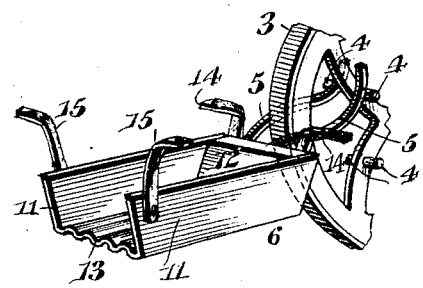
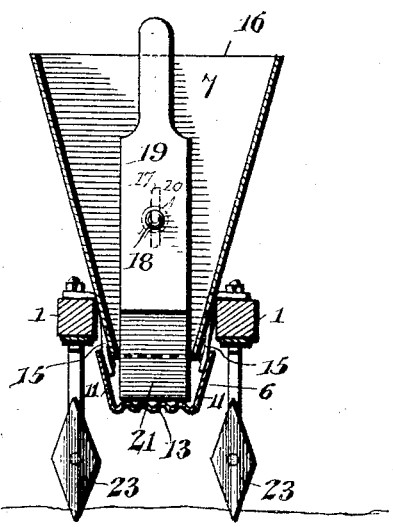
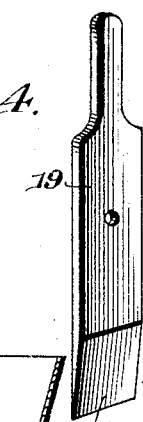
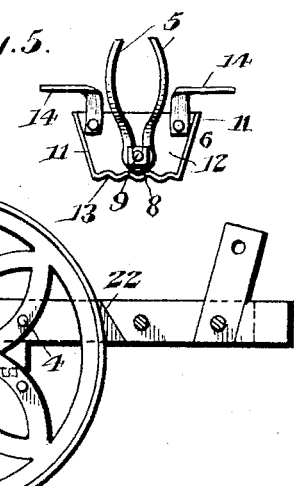
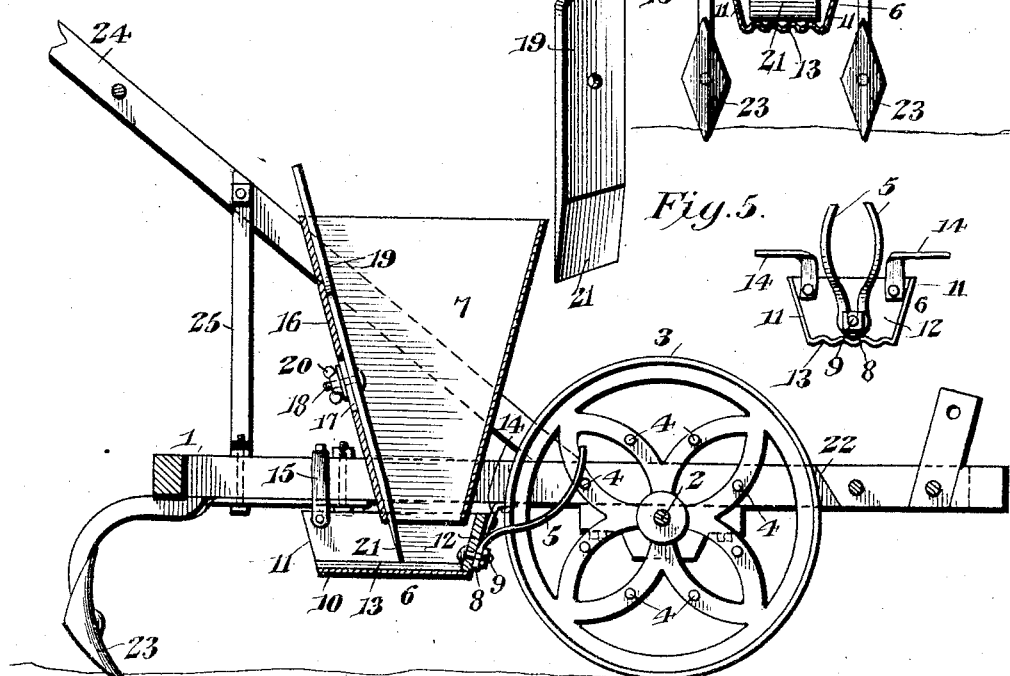
John M. Brasington, Inventor No. 779,259. Patented January 3, 1905.

UNITED STATES PATENT OFFICE.

JOHN MARION BRASINGTON, OF BENNETTSVILLE, SOUTH CAROLINA, ASSIGNOR TO C. S. McCALL, OF BENNETTSVILLE, SOUTH CAROLINA.

FERTILIZER-DISTRIBUTER.

SPECIFICATION forming part of Letters Patent No. 779,259, dated January 3, 1905.

Application filed August 16, 1904. Serial No. 220,941.

*To all whom it may concern:*

Be it known that I, JOHN MARION BRASINGTON, a citizen of the United States, residing at Bennettsville, in the county of Marlboro and State of South Carolina, have invented a new and useful Fertilizer-Distributer, of which the following is a specification.

The invention relates to improvements in fertilizer-distributers.

The object of the present invention is to improve the construction of fertilizer-distributers, more especially the means for regulating the feed and for controlling the discharge of the fertilizer, and to provide a simple and comparatively inexpensive one designed especially for use on both hilly and level land and capable of distributing guano or other fertilizer as uniformly on hilly ground where it is in an inclined position as on level ground where it is in an upright position, whereby a great saving in the fertilizer is effected.

A further object of the invention is to provide a simple and effective means for preventing the fertilizer from accumulating on and discharging wholly at the lower side of the shoe when the fertilizer-distributer is operating on hilly ground and in an inclined position.

The invention also has for its object to provide a fertilizer-distributer having means for preventing the fertilizer from catching on the lower end of the feed-regulating slide and interfering with the proper discharge from the hopper to the shoe.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a longitudinal sectional view of a fertilizer-distributer constructed in accordance with this invention. Fig. 2 is a transverse sectional view. Fig. 3 is a detail perspective view of the shaking-shoe. Fig. 4 is a detail view of the adjustable feed-regulating slide; and Fig. 5 is a detail view of the front of the shaking-shoe, illustrating the construction of the arms.

Like numerals of reference designate corresponding parts in all the figures of the drawings.

1 1 designate side bars or beams of a fertilizer-distributer frame which may be of any desired construction and which is provided at opposite sides with suitable bearings for the reception of the shaft or axle 2 of a tappet-wheel 3. The tappet-wheel 3 is provided with suitable spokes having lateral projections or tappets 4, arranged to engage arms 5 of a shaking-shoe 6, which is located beneath a hopper 7. The arms 5, which may be of any desired construction, preferably consist of a single piece of metal bent between its ends to form a loop 8, through which passes a fastening device 9 for securing the arms to the front of the shoe.

The shoe, which is substantially rectangular, consists of a bottom 10, sides 11, and a front wall 12, extending upward from the bottom to the upper edges of the sides and connecting the latter. The rear end of the shoe is open, as clearly shown in Fig. 3, and the bottom is provided with longitudinal corrugations 13, forming grooves or gutters and extending forwardly from the rear end of the bottom and adapted to cause the fertilizer to be discharged from the shoe in a series of fine streams and capable when the fertilizer-distributer is operating on hilly ground and is in an inclined position of preventing the fertilizer from sliding or shifting to the lower side of the shoe and discharging wholly at that point. By this construction the fertilizer is evenly and uniformly distributed over as large an area on hilly ground as on level surfaces, and a great saving in the fertilizer is thereby effected. The corrugations may extend the entire length of the bottom or terminate at the rear wall of the hopper, it being essential that they extend from the hopper to the rear end of the shoe. The shaking-shoe is suspended from the frame of the fertilizer-distributer by front and rear flexible straps or hangers 14 and 15, arranged at the front and rear portions of the shoe and secured to the side bars or beams by bolts or other suitable fastening devices, as clearly illustrated in Fig. 1 of the drawings. Any other suitable means may be provided for suspending the shaking-shoe of the hopper 7 of the fertilizer-distributer. When the fertilizer-distributer moves forward, the rotation of the wheel carries the tappets into engagement with the forwardly-projecting arms of the shaking-shoe and the latter is vibrated in the usual manner for causing a discharge of the fertilizer.

The hopper, which is of the usual configuration, has an inclined rear wall 16, which is provided with a slot 17, through which passes a bolt 18 for adjustably securing a slide 19 to the back or rear wall for controlling the feed. The bolt is provided with a nut 20; but any other suitable means may be employed for securing the slide in its adjustment, as will be readily understood. The lower end of the slide is beveled to provide a cutting edge 21, which is located above the bottom of the shaking-shoe and which is adapted when the shoe is vibrated to chop or cut the fertilizer, whereby the latter is effectually prevented from accumulating on the slide and interfering with the proper feed of the device.

The frame of the fertilizer-distributer is provided with a suitable scraper 22, consisting of a block beveled or cut away and arranged adjacent to the tappet-wheel for removing any mud or other accumulations from the same. Suitable blades or shovels 23 are arranged at the rear end of the frame, and the latter is provided with suitable handlebars 24, which are supported by braces 25.

Having thus fully described my invention, what I claim as new, and desire to secure by Letters Patent, is—

1. A fertilizer-distributer having a shaking-shoe provided with grooves or gutters arranged to retain the fertilizer uniformly on the shoe when the fertilizer-distributer is in an inclined position, whereby the fertilizer will be prevented from clogging and discharging wholly at one side of the shoe.

2. A fertilizer-distributer having a shaking-shoe provided at its bottom with longitudinal corrugations, arranged to prevent the fertilizer from accumulating at one side of the shoe when the fertilizer-distributer is in an inclined position.

3. A fertilizer-distributer having a shaking-shoe and provided with a feed-regulating device, having cutting means opposed to the action of the shoe for chopping the fertilizer.

4. A fertilizer-distributer provided with a feed-regulating slide having a cutting edge for chopping the fertilizer.

5. In a fertilizer-distributer, the combination with a hopper, and a shaking-shoe, of a feed-regulating slide having a lower cutting edge opposed to the action of the shoe and arranged to chop the fertilizer.

6. In a fertilizer-distributer, the combination with a shaking-shoe having a corrugated bottom, and a feed-regulating slide provided with a lower cutting edge arranged in the path of the bottom of the shoe.

7. In a fertilizer-distributer, the combination of a shaking-shoe for discharging the fertilizer, and a cutting device coöperating with the fertilizer-distributer and arranged to chop the fertilizer.

8. In a fertilizer-distributer, the combination of a shaking-shoe, and a relatively fixed cutting device arranged in the path of the shoe and adapted to chop the fertilizer.

In testimony that I claim the foregoing as my own I have hereto affixed my signature in the presence of two witnesses.

JOHN MARION BRASINGTON.

Witnesses:
J. W. SMITH,
A. G. SINCLAIR.